US008841360B2

(12) United States Patent
Arumugam et al.

(10) Patent No.: US 8,841,360 B2
(45) Date of Patent: Sep. 23, 2014

(54) ENZYME CURABLE ALKYD COMPOSITION

(71) Applicant: Rohm and Haas Company, Philadelphia, PA (US)

(72) Inventors: Selvanathan Arumugam, Blue Bell, PA (US); Ralph Even, Blue Bell, PA (US); David L. Fratarelli, West Chester, PA (US); Kathleen Manna, Quakertown, PA (US); Wei-Wen Tsai, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 105 days.

(21) Appl. No.: 13/633,250

(22) Filed: Oct. 2, 2012

(65) Prior Publication Data

US 2014/0094552 A1 Apr. 3, 2014

Related U.S. Application Data

(60) Provisional application No. 61/554,705, filed on Nov. 2, 2011.

(51) Int. Cl.
*C08L 67/06* (2006.01)
*C08L 67/08* (2006.01)
*C08K 5/3462* (2006.01)
*C08K 5/3475* (2006.01)
*C08G 63/87* (2006.01)

(52) U.S. Cl.
USPC .......................... 523/500; 524/106; 528/274

(58) Field of Classification Search
USPC ............................... 523/500; 524/106; 525/26
See application file for complete search history.

(56) References Cited

U.S. PATENT DOCUMENTS

| 6,306,991 | B1 | 10/2001 | Fischer et al. | |
|---|---|---|---|---|
| 6,607,814 | B2 * | 8/2003 | Pickett et al. | 428/212 |
| 2010/0201745 | A1 | 8/2010 | Silverbrook | |
| 2011/0250626 | A1 * | 10/2011 | Williams et al. | 435/18 |

FOREIGN PATENT DOCUMENTS

| EP | 03218272 A2 | 6/1989 |
|---|---|---|
| WO | 200128960 A1 | 4/2001 |
| WO | 2004067582 A1 | 12/2004 |
| WO | 2011053904 A1 | 5/2011 |

OTHER PUBLICATIONS

Kunamneni, Adinarayana, et al., "Laccases and Their Applications: A Patent Review", Departmento de Biocatálisis, Instituto de Catálisis y Petroleoquimica, CSIC, Cantoblanco, 28049 Madrid, Spain. pp. 1-50.

* cited by examiner

*Primary Examiner* — Tae H Yoon
(74) *Attorney, Agent, or Firm* — Willis S. Reid

(57) ABSTRACT

The present invention relates to a coatings composition comprising an alkyd, a pigment, a rheology modifier, a radical producing oxidoreductase, and one or more additives, wherein the alkyd contains at least one $C_{6-30}$—C(O)O— group having at least one diallylic group. The coatings composition of the present invention cures relatively rapidly without ancillary crosslinking agents and with minimal, if any, VOCs from solvents or coalescents.

9 Claims, No Drawings

ENZYME CURABLE ALKYD COMPOSITION

BACKGROUND

The present invention relates to an enzyme curable alkyd composition, particularly an alkyd composition cured with a radical producing oxidoreductase.

The quality and degree of ambient film formation in coatings is critical to performance. Film formation is typically achieved by evaporation, coalescence, or crosslinking, and combinations thereof. Evaporation-based film formation (also known as lacquer) is based on low solids content and large amounts of organic solvents. Though evaporation is one of the fastest and simplest methods of achieving film formation, it is severely limited by environmental legislation that limits the release of large quantities of solvent into the atmosphere. As a green alternative, film formation by coalescence has become more main stream. Nevertheless, coalescent methods, especially for high $T_g$ polymers, can require the inclusion of a small amount of a volatile solvent to plasticize the polymer, thereby promoting film formation. Low $T_g$ polymers (soft polymers), while not requiring solvent to promote film formation, produce films with inherently poorer performance.

To counteract the problems associated with softness, manufacturers of high-performance coatings rely on reactive polymer precursors to build up three-dimensionally cross-linked networks. Materials and compounds used to produce ambient temperature cross-linked polymers include drying oils, benzophenone, diacetone acrylamide/adipic dihydrazide, carbodiimide, ambient epoxy/acids, isocyanates, aminoplasts, and silanes. Although these precursors provide performance benefits, such as improvements in hardness, mar, print, dirt pickup, and chemical resistance, each has associated pitfalls such as pre-cross-linking, reliance on 2-component architecture, and potential toxicity as with metal driers like cobalt naphthenate.

In another approach, WO2004/067582 describes a method of introducing functional groups into a polymer to promote enzymatic oxidative curing. The method also requires a multi-component system and a thiol-functional compound, e.g., pentaerythritol tetrakis(3-mercaptoproprionate). However, introduction of thiol functionality into coating compositions is known to have adverse effects on pot-life (thiols are known to initiate premature cross-linking), as well as odor.

It would therefore be an advance in the art of ambient temperature cured coatings to find a curable film forming composition that has long shelf stability and a reasonably fast cure time, and does not require VOCs or malodorous chemicals.

SUMMARY OF THE INVENTION

The present invention provides a coatings composition comprising an alkyd, a pigment, a rheology modifier, a radical producing oxidoreductase, and one or more additives selected from the group consisting of fillers, biocides, surfactants, coalescents, dispersants, defoamers, and neutralizing agents; wherein the alkyd contains at least one $C_{6-30}$—C(O)O— group having at least one diallylic group.

The composition of the present invention addresses a need in the art by providing a shelf-stable formulation that is film forming at ambient temperature and cures relatively quickly without odor-producing crosslinking agents such as thiols, dithiols, or diisocyanates.

DETAILED DESCRIPTION OF THE INVENTION

The present invention is a coatings composition comprising an alkyd, a pigment, a rheology modifier, a radical producing oxidoreductase, and one or more additives selected from the group consisting of fillers, biocides, surfactants, coalescents, dispersants, defoamers, and neutralizing agents; wherein the alkyd contains at least one $C_{6-30}$—C(O)O— group having at least one diallylic group.

The alkyd of the composition of the present invention contains structural units of: 1) a triol or tetraol, preferably a triol such as glycerol, trimethylol propane, or pentaerythritol or a combination thereof; 2) a dicarboxylic acid or carboxylic acid anhydride, preferably an aromatic dicarboxylic acid or aromatic carboxylic acid anhydride such as maleic anhydride, maleic acid, phthalic anhydride, or phthalic acid, or a combination thereof; and 3) a diallylic containing carboxylic acid of the type $C_{6-30}$—COOH, such as linoleic acid.

As used herein, the term "structural units of" a particular compound refers to the remnant of that compound found in the product of interest. For example, a structural unit of glycerol is illustrated:

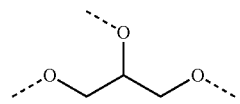

where the dashed lines represent the points of attachment.

It is understood that the structural unit of a compound does not necessarily imply that the product must be made using that compound. For example, a structural unit of a diallylic containing carboxylic acid can be formed through the corresponding ester ($C_{6-30}$—COOR) or acid halide ($C_{6-30}$—COX). Thus, a structural unit of a carboxylic acid is synonymous with a structural unit of the corresponding ester or acid halide. Similarly, a structural unit of phthalic acid is synonymous with a structural unit of the corresponding diester, diacid halide, or anhydride.

A preferred $C_{6-30}$—C(O)O— group is represented by the following formula:

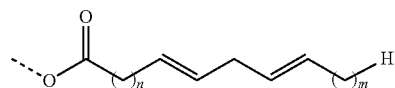

where n is 1 to 25 and m is 0 to 24, with the proviso that n+m is not greater than 25; wherein the composition is a one-pack curable coatings composition.

As used herein the term "radical producing oxidoreductase" refers to any oxidoreductase (EC1) that generates free radicals during catalysis, preferably EC1.11.1.7 (peroxidases) and EC1.10.3.2 (laccases). Peroxidases are a group of iron-porphyrin enzymes that catalyze the oxidation of a variety of organic substrates, using hydrogen peroxide, or an organic peroxide, as the oxidant. The laccase molecule, as an active holoenzyme form, is a dimeric or tetrameric glycoprotein, usually containing—per molecule—four copper atoms bound to three redox sites (Type 1, Type 2, and Type 3 Cu pair). The molecular mass of the monomer ranges from about 50 to 100 kDa, with an acidic isoelectric point around pH 4.0.

When the composition of the present invention includes a laccase, curing of the coating composition is advantageously accelerated by the presence of a chemical mediator, which is a small molecule that acts as an intermediate substrate for the laccase; the oxidized radical forms of the mediator are able to interact more efficiently than the laccase with the target. Preferably, the chemical mediator is dispersed in a suitable surfactant, preferably an anionic surfactant such as sodium dodecylsulfate. A reduction in the yellowing of the cured paint is observed when the chemical mediator is added to the formulation as a dispersion in a surfactant.

Examples of suitable laccase chemical mediators include hydroxyanthranilic acid; 2,2'-azino-bis-(3-ethylbenzothiazoline-6-sulfonic acid) (ABTS); N-hydroxybenzotriazole; N-hydroxyphthalimide; violuric acid; N-hydroxyacetanilide; 4-hydroxy-3,5-dimethoxy-benzoic acid, methyl ester; and 2,2,6,6-tetramethylpiperidine-1-yloxy free radical (TEMPO). Preferred chemical mediators are violuric acid and N-hydroxybenzotriazole.

The concentration of alkyd in the formulation varies depending on the application but typically in the range of about 25 to 60 weight percent, more preferably in the range of 30 to 40 weight percent, based on the weight of the coatings composition. It is preferred that the alkyd be added to the coatings formulation as a stable aqueous dispersion (i.e., an alkyd latex) at about 40 to 60 weight percent, based on the weight of the dispersion. Preparation of such alkyd dispersions are described, for example, in WO2011/053904 A1, pages 15-24.

The composition of the present invention further includes a rheology modifier and a pigment. Examples of rheology modifiers include associative and non-associative thickeners such as HASE, HEUR, and HEC thickeners. Examples of pigments include titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments; and hollow pigments, including pigments having one or more voids.

It has been discovered that compositions of the present invention achieve acceptable properties without the use of crosslinking agents or organic solvents, thereby creating a green alternative to presently used drying systems. More particularly, the composition preferably contains a substantial absence of a thiol functional promoting compound, such as those described in WO 2004/067582, including pentaerythritol tetrakis(3-mercaptoproprionate) and trimethylol propane tris(3-mercaptoproprionate). Preferably, the composition contains less than 1%, and more preferably less than 0.1% of any thiol functional promoting compound based on the weight of the radical producing oxidoreductase; most preferably, the composition does not include any thiol functional promoting compound.

Though not bound by theory, it is believed that curing of the composition of the present invention occurs efficiently and without the need for ancillary crosslinking agents because of the presence, in the alkyd, of an exquisitely active target: The methylene group of the diallylic moiety:

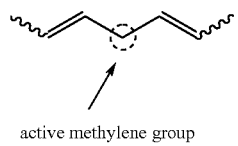

active methylene group

The composition further includes any of a number of additives suitable for a paint composition including fillers; dispersants, such as aminoalcohols and polycarboxylates; surfactants; defoamers; preservatives, such as biocides, mildewcides, fungicides, algaecides, and combinations thereof; flow agents; leveling agents; and neutralizing agents, such as hydroxides, amines, ammonia, and carbonates. The composition may include an organic solvent but it is preferred that the composition is substantially free of solvent.

EXAMPLES

The following examples are for illustrative purposes only and are not intended to limit the scope of the invention.

Intermediate 1

Preparation of the Alkyd Dispersion

The alkyd dispersion (Alkyd binder) was prepared substantially as described in WO2011/053904 A1, pp. 23-24 (inventive examples 12 and 13) except that amount of pentaerythritol was 24%; isophthalic acid, 12%; phthalic anhydride. 18%; and sunflower oil, 46%, trimethylol propane 0%. The acid value was titrated at 8 mg KOH/g of sample; the polymer was heated to 95° C. prior to introduction into the rotor stator; $NH_4OH$ was added to neutralize the acid value, and the resultant pH of the final dispersion was 8.8; the dispersion was stabilized with 4% by weight E-sperse 100 surfactant, based on the weight of the resin; the particle size of the resin in the latex was 165 nm with a polydispersity index of 0.615 (calculated as: $(D_{90}-D_{10})/D_{50}$); the percent solids of the dispersion was 51.81%; and the viscosity was 1336 cP.

For the following composition, the ingredients were added in the following order: pigment grind was added to the binder letdown, followed by addition of the drier package, and a final adjustment of the paint thickness.

Materials and Methods

Enzymes: Novozyme 51003 laccase and DSM peroxidase liquid formulations were used as is; Amano Y120 laccase (Amano Enzyme), powdered formulation, was dissolved in water to 50 mg solid/mL prior to use.

Protein Concentration Assays: Protein concentration was determined using the bicinchoninic acid (BCA) protein assay kit (Sigma-Aldrich p/n BCA1).

Examples 1-6 and Comparative Example 1

Paint Formulation and Applications Testing

A master paint was prepared according to a standard water-based alkyd paint formulation (Table 1). Water, Natrosol Plus 330 HMHEC thickener, Bentone EW rheology modifier, and AMP™ 95 Co-dispersant and Neutralizing Amine (A Trademark of The Dow Chemical Company or its Affiliates) were pre-mixed; Disperbyk 190 wetting and dispersing additive, Triton CF-10 surfactant, water, Rhodoline 643 defoamer, and ACRYSOL™ RM 8W Rheology Modifier (A Trademark of The Dow Chemical Company or its Affiliates), were pre-mixed separately and both premixes were combined in a grind pot. The blend was dispersed using a Cowles disperser and Ti-Pure R-706 was added to form the Pigment Grind. The Pigment Grind was added to the Let Down with stirring and the master paint was aliquoted into a series of samples (116 g each).

TABLE 1

Master Paint Formulation

Pigment Grind: (g)

| | |
|---|---|
| Water | 104.52 |
| Natrosol Plus 330 HMHEC thickener | 0.91 |
| Bentone EW rheology modifier | 1.30 |
| AMP ™-95 co-dispersant and neutralizing amine | 0.78 |
| Disperbyk 190 wetting and dispersing additive | 3.12 |
| Triton CF-10 surfactant | 0.91 |
| Water | 38.35 |
| Rhodoline 643 defoamer | 0.65 |
| ACRYSOL ™ RM-8W rheology modifier | 3.77 |
| Ti-Pure R-706 pigment | 454.48 |

Let Down: (g)

| | |
|---|---|
| Alkyd binder | 904.67 |
| BYK-011 defoamer | 1.69 |
| Chemguard S764P fluorosurfactant, block additive | 2.08 |
| Water | 2.08 |

Drier packages (enzymes with or without mediators) were added to the paint aliquots (Examples 1-6, Table 2). Final adjustments to rheology were made using a 1:1 dilution of ACRYSOL™ RM-2020NPR Rheology Modifier (A Trademark of The Dow Chemical Company or its Affiliates) in water. PG refers to propylene glycol. Comp. 1 refers to comparative example 1, which was prepared without enzyme.

The following levels of enzymes were used, based on binder solids: Novozyme 51003 laccase (1.5%, 51003), Amano Y120 laccase (0.16%, Y120), DSM peroxidase (1.1%, DSM). In all cases, these levels were based on measured protein concentrations, where the amount of protein that is actually the enzyme of interest is unknown. The following levels of mediators were used, based on binder solids: Hydroxybenzotriazole (HBT, 0.15%, assuming 20 wt % of the HBT was water), violuric acid (VA, ~0.05-0.15%).

Drawdowns of the paints (5 mil wet on Al panels) were prepared for Konig and print resistance testing. Drawdowns (20 mil wet on release paper) were also prepared for tensile testing. Konig testing was done using the Byk Mallinckrodt Konig Pendulum Hardness Tester. Each value reported was the average of two measurements. Print resistance testing was done by covering each drawdown with a piece of aida cloth and four #8 rubber stoppers. Weights were then placed on the stoppers and the panels were left at 60° C. for 1 h. Following removal of weights and stoppers, the panels were allowed to cool to room temperature prior to removal of the cloth. The extent of print resistance was rated according to the scale shown in Table 3. Tensile testing was done on the Tinius Olsen Tensile Tester, using ASTM D882 as a general procedure. The gauge length used was 50 mm and the strain rate was 10 per min (500 mm/min for 50 mm gauge). Tensile testing was done, in duplicate or triplicate, on films that had cured for 2-4 weeks.

TABLE 3

Print Testing Rating System Based on Extent of Imprint on Film Surface

| Rating: | 300 g mass | 200 g mass | 100 g mass | 50 g mass |
|---|---|---|---|---|
| 10 | none | none | none | none |
| 9 | slight | none | none | none |
| 8 | moderate | slight | none | none |
| 7 | moderate | moderate | slight | none |
| 6 | moderate | moderate | slight | slight |
| 5 | strong | moderate | moderate | slight |
| 4 | strong | strong | moderate | slight |
| 3 | strong | strong | moderate | moderate |
| 2 | strong | strong | strong | moderate |
| 1 | strong | strong | strong | strong |

Film hardness, print resistance and tensile strength for the coatings are shown in Table 4.

TABLE 2

Formulation of Drier Packages, Viscosity Adjustment, and Properties

| Paint:<br>Drier Pkg: | Comp. 1<br>No Drier | Ex. 1<br>Y120 | Ex. 2<br>Y120/<br>HBT | Ex. 3<br>Y120/<br>VA | Ex. 4<br>51003 | Ex. 5<br>51003/<br>HBT | Ex. 6<br>DSM |
|---|---|---|---|---|---|---|---|
| Enzyme Pre-mix: | | | | | | | |
| Enzyme (g) | | 0.50 | 0.50 | 0.50 | 10.00 | 10.00 | 10.00 |
| Water (g) | 10.00 | 10.00 | 10.00 | 10.00 | | | |
| Mediator Pre-mix: | | | | | | | |
| PG (g) | 0.67 | 0.67 | 0.67 | 0.67 | 0.67 | 0.67 | 0.67 |
| Water (g) | 0.66 | 0.66 | 0.66 | 0.66 | 0.66 | 0.66 | 0.66 |
| Ethanol (g) | 0.67 | 0.67 | 0.67 | 0.67 | 0.67 | 0.67 | 0.67 |
| Mediator (g) | | | 0.068 | 0.062 | | 0.068 | |
| Water (g) | 1.00 | 1.00 | 1.00 | 1.00 | 1.00 | 1.00 | 1.00 |
| Viscosity Adjustment: | | | | | | | |
| ACRYSOL ™ RM-2020NPR (g) | 2.50 | 2.35 | 2.32 | 2.36 | 2.63 | 2.58 | 2.65 |
| Water (g) | 2.85 | 2.35 | 2.32 | 2.36 | 2.63 | 2.58 | 2.65 |
| Properties: | | | | | | | |
| pH | 7.59 | 7.41 | 7.08 | 7.21 | 7.67 | 7.38 | 7.11 |
| KU (cP) | 94.6 | 95.3 | 97.1 | 99.0 | 98.0 | 96.8 | 104.8 |
| ICI (cP) | 1.465 | 1.350 | 1.505 | 1.505 | 1.685 | 1.550 | 1.180 |

TABLE 4

Film Hardness, Print Resistance, and Tensile Strength Data

| | Paint:<br>Drier<br>Package: | Comp.<br>1<br>No<br>Drier | Ex. 1<br>Y120 | Ex. 2<br>Y120/<br>HBT | Ex. 3<br>Y120/<br>VA | Ex. 4<br>51003 | Ex. 5<br>51003/<br>HBT | Ex.<br>6<br>DSM |
|---|---|---|---|---|---|---|---|---|
| Konig<br>Values<br>(s) | 1 day<br>3-5<br>days<br>7 days | n.d.<br>4.9<br>5.6 | n.d.<br>7.0<br>9.8 | 11.2<br>15.4<br>15.4 | 9.1<br>15.4<br>16.1 | n.d.<br>5.6<br>7.0 | n.d.<br>14.0<br>14.7 | 4.9<br>12.6<br>14.0 |
| Print<br>Resis-<br>tance | 1 day<br>3-5<br>days<br>7 days | 3.0<br>2.0<br>4.5 | 4.5<br>7.0<br>8.0 | 8.0<br>8.5<br>9.5 | 8.0<br>8.5<br>9.5 | 7.0<br>7.0<br>8.0 | 7.5<br>8.0<br>9.5 | 1.0<br>8.0<br>8.5 |
| Tensile<br>Mod-<br>ulus<br>(MPa) | 2-4<br>weeks | n.d. | 4 | 14 | 18 | n.d. | 21 | 14 | n.d. = not determined because film was too tacky

The results show that film hardness, print resistance, and tensile strength are greatly improved for coatings containing the enzyme; furthermore, the properties of the coatings containing Y120 and 51003 laccases are markedly improved by the inclusion of a chemical mediator. The results show that curing was effectively complete (dry-to-the-touch) within 2-3 days.

Formulations that had been stored for 6 months using the same formulation as outlined in Table 1 (and a similar alkyd binder) were evaluated for film hardness. As illustrated in Table 5, the formulations maintained acceptable Konig hardness and print resistance properties, indicating that they were shelf-stable for at least 6 months.

TABLE 5

Film Hardness and Print Resistance for Paint Aged 6 Months

| | Paint:<br>Drier Package: | Comp. 2<br>No Drier | Ex. 7<br>DSM | Ex. 8<br>*Y120/HBT |
|---|---|---|---|---|
| Konig Values<br>(s) | 3 days<br>7 days | n.d.<br>n.d. | 11.2<br>11.2 | 9.1<br>10.5 |
| Print<br>Resistance | 7 days | 1.0 | 9.0 | 9.0 | n.d. = not determined because film was too tacky;
*Y120 used at 0.3%, based on binder solids

The invention claimed is:

1. A coatings composition comprising an alkyd latex, a pigment, a rheology modifier, a radical producing oxidoreductase, and one or more additives selected from the group consisting of fillers, biocides, surfactants, coalescents, dispersants, defoamers, and neutralizing agents; wherein the alkyd contains at least one $C_{6-30}$—C(O)O— group having at least one diallylic group.

2. The coatings composition of claim 1 wherein the $C_{6-30}$—C(O)O— group is represented by the following formula:

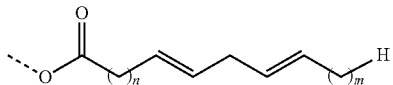

where n is 1 to 25 and m is 0 to 24, with the proviso that n+m is not greater than 25; wherein the composition is a one-pack curable coatings composition.

3. The composition of claim 1 wherein the alkyd is further characterized by structural units of: a) an aromatic anhydride or a diacid; and b) a triol.

4. The composition of claim 3 wherein the triol is glycerol, trimethyol propane, or pentaerythritol or a combination thereof; the anhydride or acid is maleic anhydride, maleic acid, phthalic anhydride, or phthalic acid, or a combination thereof; and the radical producing oxidoreductase is a laccase or a peroxidase.

5. The composition of claim 1 wherein the $C_{6-30}$—C(O)O— group is represented by the following formula:

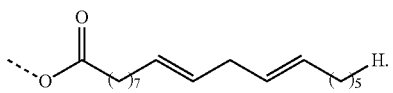

6. The composition of claim 5 wherein the radical producing oxidoreductase is a laccase and the composition further includes a chemical mediator.

7. The composition of claim 6 wherein the chemical mediator is N-hydroxybenzotriazole or violuric acid.

8. The composition of claim 1 which comprises less than 1% of a thiol functional crosslink-promoting compound based on the weight of radical producing oxidoreductase.

9. The composition of claim 7 wherein the chemical mediator is dispersed in an anionic surfactant.

* * * * *